US008442918B2

(12) United States Patent
Gabriele et al.

(10) Patent No.: US 8,442,918 B2
(45) Date of Patent: May 14, 2013

(54) CASHBOX COUPON FOR A GAMING MACHINE

(75) Inventors: James P. Gabriele, Concord (CA); Simcha C. Bielak, Concord (CA); Dmytro Baydin, Concord (CA); Daniel Vienneau, Dieppe (CA); Michel Vienneau, Dieppe (CA)

(73) Assignee: Crane Canada Co., Concord, ON (CA)

( * ) Notice: Subject to any disclaimer, the term of this patent is extended or adjusted under 35 U.S.C. 154(b) by 191 days.

(21) Appl. No.: 12/662,163

(22) Filed: Apr. 1, 2010

(65) Prior Publication Data

US 2010/0323789 A1 Dec. 23, 2010

Related U.S. Application Data

(63) Continuation-in-part of application No. 12/573,406, filed on Oct. 5, 2009.

(60) Provisional application No. 61/102,660, filed on Oct. 3, 2008.

(51) Int. Cl.
*G06Q 50/00* (2012.01)
*A63F 9/24* (2006.01)
*A63F 13/02* (2006.01)

(52) U.S. Cl.
USPC .................................. 705/64; 463/29; 463/47

(58) Field of Classification Search .................... 705/64; 463/29, 47
See application file for complete search history.

(56) References Cited

U.S. PATENT DOCUMENTS 5,477,952 A 12/1995 Castellano et al.
6,067,530 A * 5/2000 Brooks et al. ................... 705/30
6,110,044 A 8/2000 Stern
6,742,644 B1 * 6/2004 Heidel .......................... 194/206
6,852,029 B2 2/2005 Baltz et al.
7,428,985 B1 * 9/2008 Moreland et al. ............. 235/379
7,641,555 B2 * 1/2010 McKinley et al. .............. 463/43
2006/0293783 A1 * 12/2006 Hand et al. .................... 700/231
2008/0011840 A1 * 1/2008 MacKenzie et al. .......... 235/385

FOREIGN PATENT DOCUMENTS

WO WO2004/010367 A1 * 1/2004

OTHER PUBLICATIONS

GDS Note Acceptor: Communication Protocol Draft v1.0.1, Gaming Standards Association Technical Committee, Aug. 22, 2005, 84 pages.*
GDS Bar Coded Ticket Specification v1.0.0, Document ID: gsa-p0038.001.01, Gaming Standards Association Technical Committee, Aug. 22, 2005, 9 pages.*
GSA GDS Note Acceptor Communication Protocol v1.0.1, 2005 Gaming Standards Association, Sep. 10, 2005, 84 pages.*
FKI Security Group, "McGunn Smart Cashier v. 3.09 Operations Manual", undated, New Albany, IN, USA.

* cited by examiner

*Primary Examiner* — James D Nigh

(57) ABSTRACT

The present invention provides a method for an additional security feature on a gaming machine regarding the content of a cashbox positioned within the gaming machine through the printing of a coupon. The method involves transferring information from a bill validator to a printer all within a gaming machine wherein the transfer of the information is achieved by a serial port connection between the bill validator and the printer.
The present invention also provides a system for an additional security feature to a gaming machine through the printing of a coupon containing information relating to the content of a cashbox positioned within the gaming machine. The coupon is produced by information retrieved from the bill validator. The transfer of the information from the bill validator to the printer is achieved through a serial port interconnection between the bill validator and the printer.

24 Claims, 7 Drawing Sheets

CASHBOX COUPON FOR A GAMING MACHINE

This application is a Continuation-In-Part of pending application Ser. No. 12/573,406, that is a continuation of abandoned provisional application Ser. No. 61/102,660 filed Oct. 3, 2008.

FIELD OF THE INVENTION

The invention relates generally to casino cash control systems and specifically to an additional security feature for the content of cashboxes in gaming machines.

BACKGROUND OF THE INVENTION

In the early 1990's there was a fundamental change in the performance and capability of gaming machines initiated by the incorporation of bill acceptors into such machines. Bill acceptors are devices which receive paper currency ("currency") and, using a validator having both hardware and software components, the received currency is scanned with a variety of sensors and the sensor information is analyzed to determine (1) authenticity and (2) denomination of the currency from the scanned data. If the scanned currency is determined to be authentic currency, e.g. a United States $1, $5, $10, $20, $50 or $100 bill or other legal tender currency, it is transported to a cashbox within the bill acceptor for storage.

Based upon the denomination of the accepted currency, a signal is sent from the validator to the host machine's controller or processor to cause the machine to accumulate a corresponding amount of credits within the machine's credit meter representing the cash value or credits available for purchasing products or wagering, in the case of a gaming machine. As the user purchases products from or plays the machine, the purchase price or wager is debited from the credit meter. In the case of a gaming machine, wins are either accumulated as credits or paid out in coins. Acceptors of this type are known and are discussed for example in U.S. Pat. No. 5,863,039 issued Jan. 26, 1999 to Suzuki.

Through the use of such bill validators, casinos have been required to carefully monitor the content of cashboxes within the gaming machine. However, the transfer of information from the bill validator is made generally through an existing central processing system which requires complex software to assure validity and security of the data from the bill validator.

Accordingly there is a need for a method and a system which allows a bill validator to provide reports, particularly for the production of a bar coded report for a gaming machine. Preferably one report indicates the content of the cashbox. Such a system can be used with a casino's central processing system without modification of the host game machine.

The above described and many other features and attendant advantages of the present invention will become apparent from a consideration of the following detailed description in conjunction with the accompanying drawings.

SUMMARY OF THE INVENTION

A method according to the present invention comprises receiving, by a bill validator having an associated cashbox, a signal from a switch of the bill validator indicating at least one actuation of the switch and determining by the bill validator that the received signal comprises a request to generate one of a plurality of bill validator reports. The request further comprises one of a plurality of report generation codes wherein each report generation code identifies a specific one of the plurality of bill validator reports. Each report generation code comprises a specific actuation sequence of the switch. The further comprises generating by the bill validator the specified bill validator report based on the determined report generation code. The method includes sending by the bill validator a specified bill validator report to a printer.

This particular method advantageously allows a bill validator to produce in combination with a printer the various reports. This particular method has application in association with a gaming machine where the bill validator and the printer are each a peripheral unit of the gaming machine.

The present invention is also directed to a gaming machine comprising a host computer controlling a plurality of peripheral devices using an acceptable protocol. The peripheral devices include a printer and a bill validator having an associated cashbox. The bill validator and the printer are each separately connected to the host computer and connected to each other by a separate communication channel. The bill validator further comprises a switch which when actuated emits a signal and the bill validator includes a processor and a memory comprising computer executable instructions which when executed by the processor causes the processor to form the method of receiving a signal from the switch indicating at least one actuation of the switch determining that the received signal comprise a request to generate one of a plurality of bill validator reports; the request further comprising one of a plurality of report generation codes wherein each report generation code identifies a specific one of the plurality of bill validator reports and wherein each report generation code comprises a specific actuation sequence of the switch; generating the specified bill validator report based on the determined report generation code; and sending the specified bill validator report to the printer using the separate communication channel.

The gaming machine as defined in the present application can advantageously include the bill validator and printer having these capabilities while still communicating with the host computer of the gaming machine in a traditional manner. With this arrangement, there is no requirement to update the software of the host machine.

In a preferred aspect of the invention, the bill validator reports include the banknote sequence report that includes details of a last sequence of banknotes and/or coupons received by the bill validator. In a further aspect of the invention, the bill validator reports include a cashbox audit report of the contents of the cashbox. In yet a further aspect of the invention, the bill validator includes a cashbox removal procedure that uses the cashbox audit report of the contents of the cashbox which is printed by the printer and received by the bill validator and stored in the cashbox prior to release of the cashbox from the bill validator.

In a further aspect of the invention, the switch is part of a cashbox latch. In actuation of the switch is a depression of the cashbox latch and each specific actuation sequence is a series of depressions of the cashbox latch and/or a depression of the cashbox latch of a specified time interval.

The present invention is also directed to a system that includes the bill validator and a printer where the bill validator includes the above-identified report generation function and method. This system can certainly be used in a gaming machine but is not limited to that particular application.

The present invention provides a system that allows for an additional security feature preferably for a gaming machine through the printing of a report containing information relating to the content of a cashbox positioned within the gaming machine. Different types of reports are available.

The report is produced by information retrieved from the bill validator. The transfer of the information from the bill validator to the printer preferably using a serial port interconnection between the printer and bill validator.

BRIEF DESCRIPTION OF THE DRAWINGS

It will now be convenient to describe the invention with particular reference to one embodiment of the present invention. It will be appreciated that the figures relate to one embodiment of the present invention only and are not to be taken as limiting the invention.

DETAILED DESCRIPTION OF THE PREFERRED EMBODIMENTS

The method of the present invention creates an additional audit trail for a casino employing gaming machines. A cashbox from a gaming machine is generally replaced when it is either full or at night, however there may be other situations in which the cashbox is also replaced. Upon removal of the cashbox, the bill validator from the gaming machine produces a count of the cash within the cashbox, for validation by the back office, where the cash is counted. The back office uses the count produced by the bill validator and compares it with the amount of cash in the cashbox. This procedure of printing a ticket with information on cash counts provides extra security over the previously-existing accounting systems, in addition to providing casinos with the convenience of producing a cash count instantaneously.

The present invention will now be described more fully hereinafter with reference to the accompanying figures, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
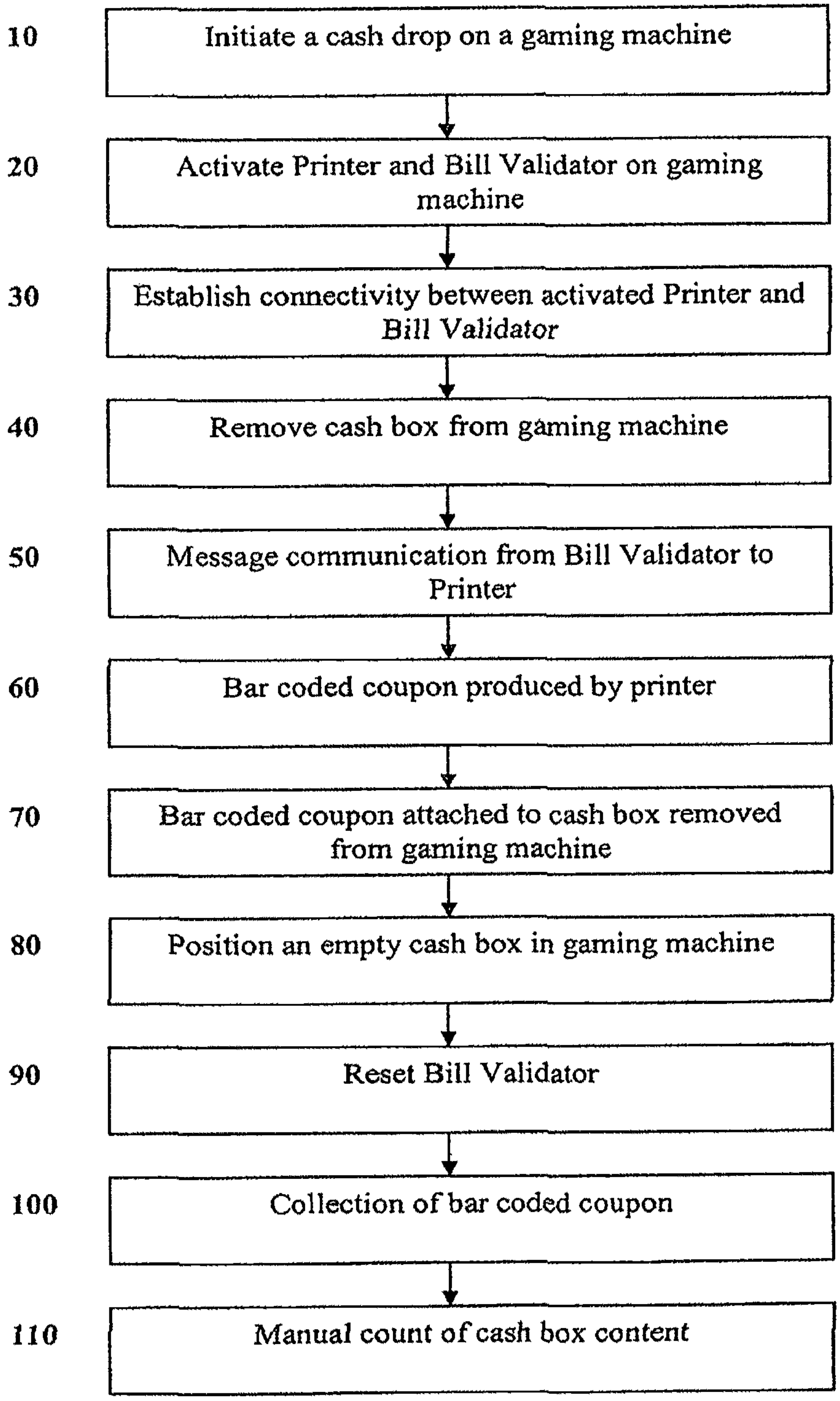
FIG. 1 is a flow chart setting out the steps for printing a bar code coupon regarding the content of a cashbox within a gaming machine, according to one embodiment of the present invention.

With reference to FIG. 1 and according to one embodiment of the present invention, at step 10, a cash drop on a gaming machine is initiated. A cash drop in relation to gaming machines occurs when a cashbox is removed from a gaming machine and an empty cashbox is positioned within the gaming machine. Cash drops are typically performed nightly, when the casino is nearly empty, by technicians. Sensors may also be present in each cashboxes that are triggered when the cashbox is full. The signal is sent through the central system in the casino. If there is no central system, the technician may be advised that a cash drop has been initiated through a light illuminated on top of the gaming machine. A cash drop is not normally performed when a player is on a machine, but if the cashbox is full, then play is suspended while the drop is performed by a technician. The gaming machines are emptied one at a time by a technician, but if there are several technicians on the floor at once, it is possible that several cash drops may be performed simultaneously.

With reference to FIG. 1 and according to one embodiment of the present invention, at step 20, the bill validator and the printer of a gaming machine are activated through a power source since a cash drop has been initiated. The bill validator initiates itself, meaning it resets its internal variables, all the while maintaining the cash count from its previous operation. The bill validator does not lose its cash count even when powered off and on again. The printer also initiates itself and ensures that it is working.

Figure 2:
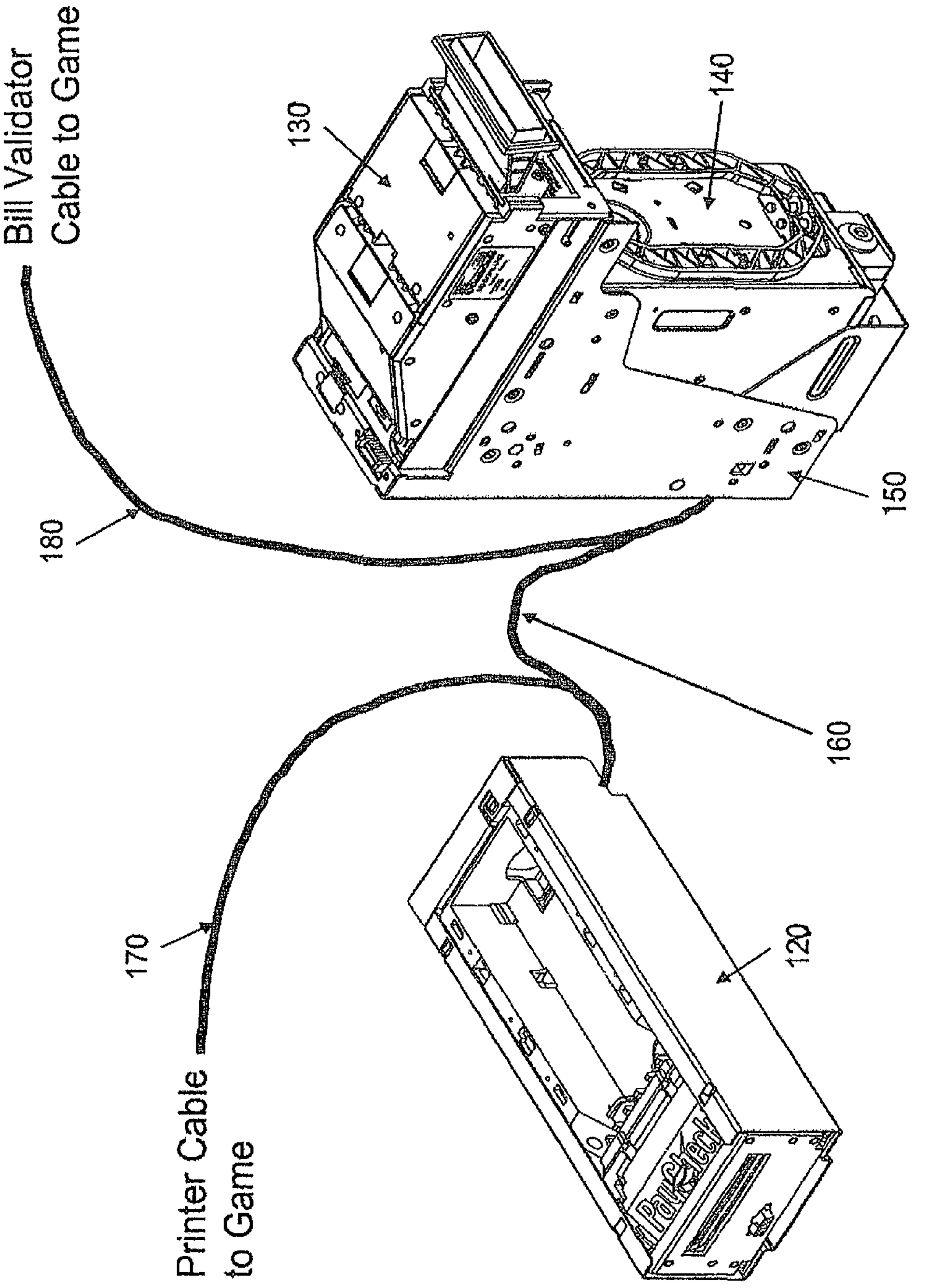
FIG. 2 is a representative drawing of the interconnection between a printer and a bill validator according to one embodiment of the present invention.

With further reference to FIG. 1 and according to one embodiment of the present invention, at step 30 the bill validator establishes connectivity to the printer by means of a serial port connection (as shown in FIG. 2). To achieve such connectivity, the bill validator sends initiation signals through the serial port connection, and the connection is established when the printer replies or by the printer simply receiving the information from the bill validator. By means of this direct link between the bill validator and the printer, the bill validator can produce a ticket containing the cash count within the cashbox, without going through the central system. The absence of not having to go through the central system provides simplicity in that the firmware within the slot machine, which is connected and communicates with the central system, does not have to be changed in order to incorporate these features. It also avoids the need for the long and expensive process of jurisdictional approval. The connectivity of the bill validator and the printer of the gaming machine can be interrupted at any time by simply disconnecting a serial port connection at either the bill validator or at the printer when a dedicated connection is utilized to interconnect the bill validator and the printer.

With further reference to FIG. 1 and according to one embodiment of the present invention, at Step 40 a technician opens the security cage and removes the cashbox from the receiving structure positioned under the bill validator contained within a gaming machine as would be known by a worker skilled in the relevant art.

With further reference to FIG. 1 and according to one embodiment of the present invention, at Step 50 and upon removal of the cashbox, the bill validator sends a message to the printer through the serial connection, containing total cash value, the number of bills in the cashbox by denomination, and the cashbox Asset Number, which is a unique number assigned to the bill validator, related to the printed circuit board serial number. TITO (Ticket-in ticket-out) information is also sent within the message along with the number of bills, in order to facilitate accounting. A TITO ticket, containing a TITO bar code, is produced by a gaming machine for the player when they have some winnings on a gaming machine, but would prefer to take those winnings to another machine. The TITO bar code holds the balance of winnings information, which is then transferred to the new machine by means of the bill validator, which reads the balance and credits the player, so the player may continue playing. In other embodiments, the bill validator may also send information containing the bill validator's serial number, as well as the date, time, reference number for the drop, as well as other information not enumerated here. The data sent through the serial cable may also be encrypted.

With further reference to FIG. 1 and according to one embodiment of the present invention, at step 60, a bar coded coupon is produced once the information is sent to the printer which contains the information as described above. As would be known by a worker skilled in the relevant art, the coupon may not include a bar code but rather have a readable printout of the information retrieved from the bill validator. If the printer is not connected, or is out of order, then the message for producing a bar code is not sent and the gaming machine will continue to function as normal. The gaming machine is not affected by the operation or non-operation of the connection between the bill validator and printer. Since the connection does not impact the gaming machine, there is no need to modify the firmware within the gaming machine to handle the fault signal of a non-working connection. The gaming machine handles its signals in the normal manner in spite of the operation or non-operation of the communication link, for instance if the printer is out of paper, or the cashbox is full, a signal may be sent to the central system and a light may illuminate. The presence of the communication link between the bill validator and the printer has no effect on the normal operation of the gaming machine, except to produce the information stated above in the form of a printed bar code or in the format as desired by the casino operators.

With further reference to FIG. 1 and according to one embodiment of the present invention, at Step 70 the technician collects the bar coded coupon and attaches it to the side of the cashbox, by means of a pouch or the like. With further reference to FIG. 1 and according to one embodiment of the present invention, at Step 80 the technician positions an empty cashbox within the gaming machine and locks the security cage.

With further reference to FIG. 1 and according to one embodiment of the present invention, at Step 90, the bill validator, sensing that the cashbox has been replaced, resets its figures of the cash contained in the cashbox to zero. The counter is now ready to count the cash passed through the bill validator by the player as the gaming machine is used.

With further reference to FIG. 1 and according to one embodiment of the present invention, at Step 100, the back office collects the coupon with the cashbox, and decodes the contents of the bar code using a standard bar code scanner. The decoded information is entered into a database for the use of the back office. A person skilled in the art would know that the bar code may be 1 dimensional, as in the standard UPC code, or 2 dimensional, as used in airline tickets, for example.

With further reference to FIG. 1 and according to one embodiment of the present invention, at Step 110, the cashbox is counted manually or by other means, and the resulting amount is compared to the amount counted by the bill validator and collected by the back office in Step 100. The back office may then note and investigate any discrepancies between the amounts.

With reference to FIG. 2 and according to one embodiment of the present invention, a printer 120 is shown as would be found in a gaming machine. A bill validator 130 is also shown as would be found in a gaming machine. A worker skilled in the relevant art would be familiar with various power sources wherein the printer 120 and the bill validator 130 may have the same or different power sources. A worker skilled in the relevant art would also be familiar as to how to install both the printer and the bill validator in a gaming machine. A cashbox 140 is positioned underneath the bill validator 130 wherein the bill validator 130 is operatively connected to the cashbox. The cashbox 140 is positioned under the bill validator 130 within a receiving structure 150 supporting the bill validator 130.

With further reference to FIG. 2 and according to one embodiment of the present invention, the bill validator 130 has a 9 pin D-sub connector and has screws to attach serial cable 160. A worker skilled in the relevant art would be familiar with the ability to incorporate the serial cable 160 within the respective harnesses 170 and 180 or in the alternative have a specific connection between the printer 120 and bill validator 130 to receive the serial cable 160. The printer 120 also incorporates a 9 pin D-sub connector and has screws to attach the serial cable 160. A worker skilled in the relevant would be familiar with a number of various connections which could be utilized in order to interconnect the printer 120 and bill validator as would be accepted by the gaming standards association or as technically required to achieve the transfer of information between the printer 120 and the bill validator 130. The protocol format between the printer 120 and the bill validator 130 shall be as per the Gaming Standard Association (GSA) Gaming Device Standard (GDS) Page Description Language (PDL) Specification. In one embodiment of the present invention, the current messaging between the printer 120 and the bill validator 130 is a one way communication from the bill validator 130 to the printer 120. In another embodiment of the present invention, a two way communication between the printer 120 and the bill validator 130 is installed which is compliant with GSA GDS PDL Specifications.

With further reference to FIG. 2 and according to one embodiment of the present invention, once the cashbox 140 is removed from the receiving structure 150, the bill validator forwards information for printing by the printer 120. The various types of information which can be obtained from the bill validator 130 is described below which can be in the form of a report or coupon which are interchangeable. Various types of bill validator reports can be produced and are subsequently described.

The latch 190 is toggled a number of times to "request" different reports. The latch 190 includes a switch monitored by the bill validator indicating whether the latch is engaged or disengaged. In this way the toggling of latch 190 produces different signals. Latch 190 can be toggled to produce a bill validator report signal, a service report signal, a financial report signal and a banknote report signal.

Figure 3:
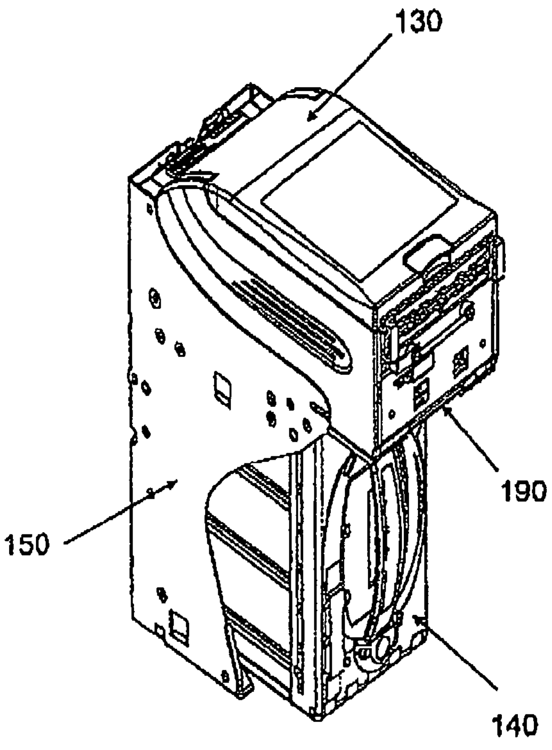
FIG. 3 is a representative drawing of a bill validator and a cashbox installed within a receiving structure according to one embodiment of the present invention.

With reference to FIG. 3 and according to one embodiment of the present invention, the bill validator 130 and the cashbox 140 are positioned within the receiving structure 150. The cashbox 140 can be removed by applying pressure on the latch 190 that includes a switch monitored by the bill validator that indicates whether the latch is engaged or disengaged. Prior to removing the cashbox 140 from the receiving structure 150, a technician can request various reports to be printed by the printer 120 based on information provided by the bill validator 130. For example, upon a technician pressing the latch 190 four times within six seconds the bill validator generates a performance report that is provided to the printer 120. The performance report in one embodiment of the present invention consists of two thermal tickets shown in FIGS. 4 and 5. The first ticket is a printer performance report 200 (FIG. 4) and contains information about the printer 120. The second ticket is a Bill Validator Performance Report 210 (FIG. 5) and contains information about the bill validator 130.

The use of two performance reports allows a technician to attach either ticket to a printer or a bill validator that needs to be returned for service. The performance report provides the ability for a technician to verify as well the performance of either the printer 120 or the bill validator 130 without the need for special tools while at the machine. With the system as described above, a technician toggles latch 190 of the bill validator in a particular manner to "request" a Performance Report of the bill validator. The bill validator recognizes this request and outputs a report on the second channel directly to the printer. The printer receives this signal and prints the Bill Validator Performance Report 210. The printer 120 also produces its own Performance Report 200 whenever a Bill Validator Performance Report has been "requested" of the bill validator. Thus the inputted "request" at the bill validator is communicated to the printer to produce Performance Reports at the game machine. These reports could each include their own code signal to request the respective Performance Reports if this is preferred. It is also possible to have a "request" for a Printer Performance Report initiated by the technician at the printer.

Figure 6:
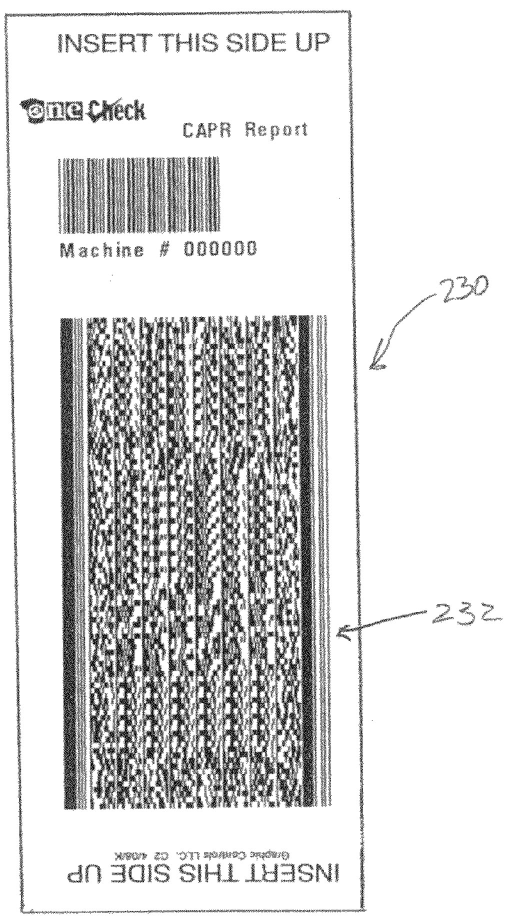
FIG. 6 illustrates a sample of a 2 dimensional bar coded Cashbox Audit and Performance Report (CAPR)

A further bill validator report can be obtained by pressing and holding the latch 190 for three seconds and a Cashbox Audit and Performance Report (CAPR report) is generated and printed as ticket 230 shown in FIG. 6. The Cashbox Audit and Performance Report 230 is in the form of a two-dimensional barcode. This report contains details of the contents of the cashbox and performance information of both the printer 120 and the bill validator 130. In a preferred embodiment, once the cashbox audit and performance report is printed, the technician has 10 seconds to insert the printed cashbox audit and performance report into the bill validator 130 for stacking in the cashbox 140. The stacking operation is not reported to the machine and is not recorded as being an operation of the bill validator 130. The successful transfer of the cashbox audit and performance report to the cashbox 140 preferably automatically clears or resets the information in the bill validator memory in a manner appropriate for receipt of a new cashbox. If the cashbox audit report and performance report is not successfully transferred to the cashbox 140, the bill validator memory is not cleared and another cashbox audit and performance report has to be generated by the technician in order to complete the transfer of the cashbox audit and performance report to the cashbox 140 within the allocated time of 10 seconds.

In one embodiment of the present invention, the cashbox audit and performance report is printed by using both a one-dimensional barcode to provide location information and a two-dimensional barcode to provide the cashbox audit and performance report data. In an another embodiment, the cashbox audit and performance report has two tickets wherein a first ticket has a two dimensional bar code with the cashbox audit and performance data and a second ticket has a one-dimensional bar code and a text version of the cashbox audit.

The printer performance information is combined by the printer in the case of a one way communication channel, with the CAPR report if combined information is provided. In some cases this report may provide only limited printer information such as its own unique identification address.

With further reference to FIG. 3, once the Cashbox Audit and Performance Report 230 has been successfully transmitted to the cashbox 140, the cashbox 140 is removed from the receiving structure 150 and a new cashbox 140 is placed within the receiving structure 150. The cashbox 140 removed from the gaming machine (not shown) is then transferred to a secure location in order to allow for the content to be removed and confirmed as defined on the cashbox audit and performance report and as reported in the normal manner by the gaming machine.

Figure 7:
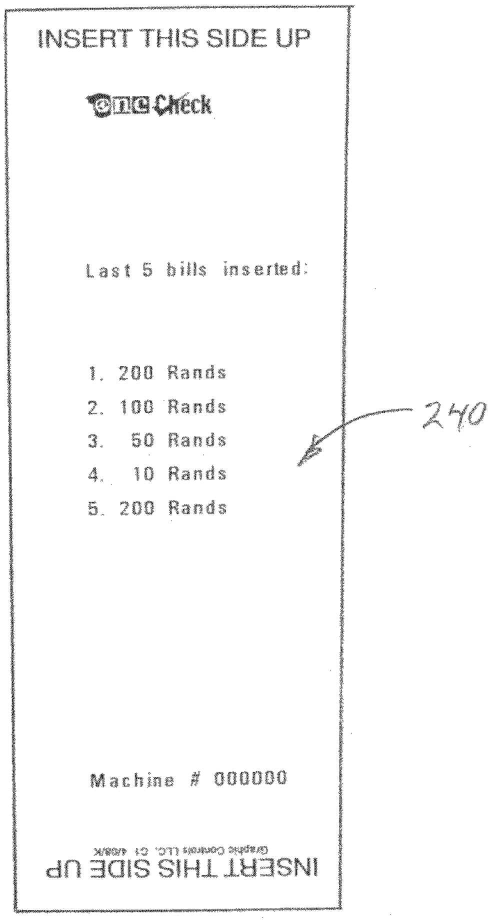
FIG. 7 is a sample Last 5 Bills Inserted Report.

With further reference to FIG. 3 and according to another embodiment of the present invention, a Last 5 Bills Inserted Report 240 (shown in FIG. 7) can be generated by the printer 120 by pressing on the latch 190 twice within six seconds. The purpose of this report is to assist operators in the event of a bill dispute on the casino floor. This allows an operator to initially maintain the cashbox in the gaming machine and discuss with the patron the printed report of the recent bills or coupons processed by the bill validator. This is often sufficient to resolve the dispute without removal of the cashbox. This process often returns the game machine to its normal operation faster and also allows the patron to resume play without additional delay. Although the report is shown in FIG. 7 as the last 5 bills, it may be the last several bills and/or coupons, for example the last 3 bills and/or coupons.

In one embodiment of the present invention, the information contained in the various reports printed by the printer based on information provided by the bill validator would be known by a worker skilled in the relevant art. For example, the printer performance report could include date, time, gaming machine location, number of tickets printed, speed of the printer, temperature, HPQ burn time, voltage and baud rate. As a further example, the performance report from the bill validator could include information relating to the average acceptance rate, rejects based on sensors, settings, fast feed or others, number of bills jammed and the number of bills inserted. The cashbox audit and performance report using a two dimensional bar code region will be printed based on information from both the bill validator and the printer. The printer will combine the cashbox audit information and the bill validator statistics along with the printer's own statistics to create the bar code. A worker skilled in the relevant art would also be familiar with the inclusion of various logos or any other information that is contained within the printer and the bill validator.

Figure 4:
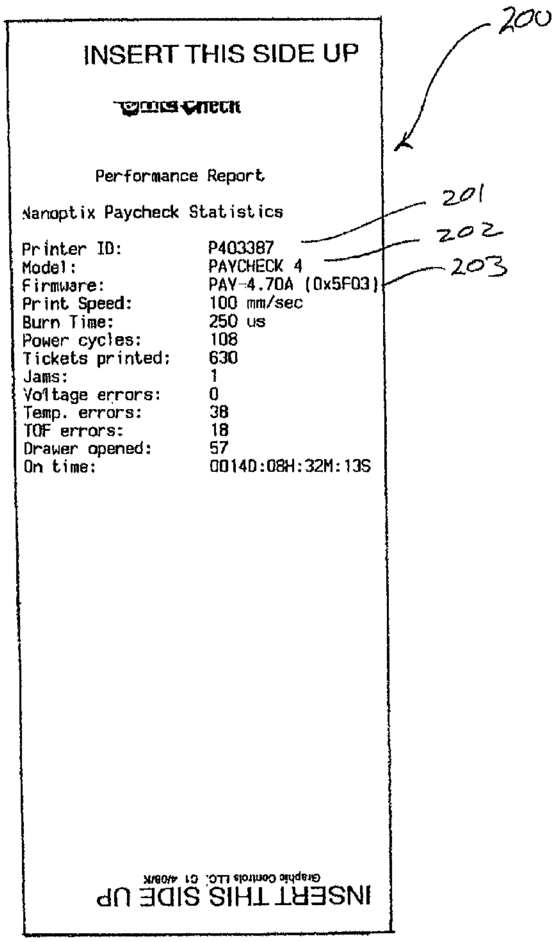
FIG. 4 illustrates a sample printer performance report.

The printer performance report 200 of FIG. 4 as previously stated can include information that is helpful to a technician in investigating a problem at a gaming machine. The report 200 includes a printer ID 201 and a model number shown as 202 and also includes the firmware description shown as 203. The firmware 203 is the software that the printer is using and this information is quite valuable to a technician as there may be known problems associated with particular firmware. Other information is provided that also allows investigation of the printer.

Figure 5:
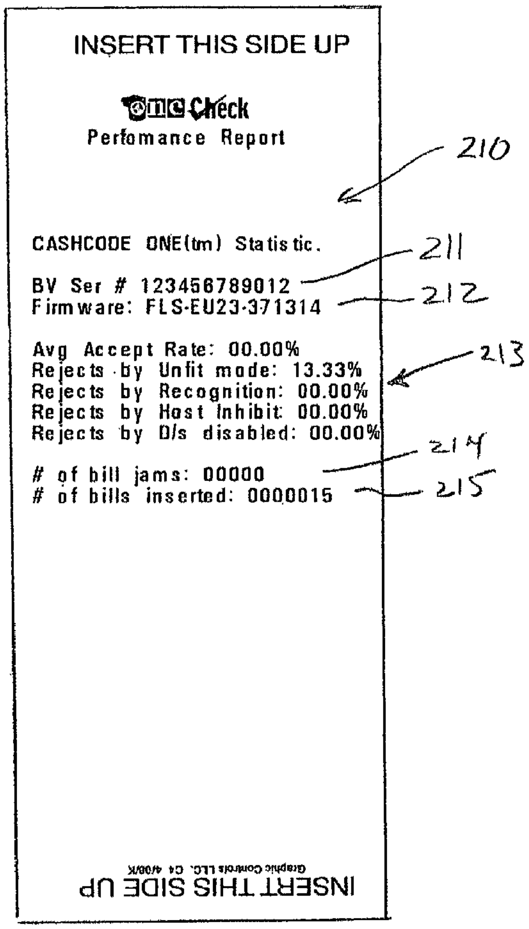
FIG. 5 illustrates a sample Bill Validator Performance Report.

The bill validator performance report 210 shown in FIG. 5, includes the bill validator serial number shown at 211, the firmware used by the bill validator at 212, information with respect to the acceptance rate and rejects at 213, the number of bill jams at 214, and the number of bills inserted at 215.

The bill validator performance report 210 allows a technician to produce at the gaming machine a report that allows assessment of the bill validator. This summary information is helpful to the technician in deciding whether or not the bill validator needs to be removed. The removal of a bill validator is carried out in a specified manner typical in accordance with the specific gaming jurisdiction. This is a time consuming procedure and takes the game machine out of normal operation during the bill validator exchange. The summary report assists the technician in determining whether the validator exchange is necessary.

A further advantage of the bill validator performance report 210 is that the bill validator often records additional information that is not provided to or available to the gaming machine. The gaming machine software normally provides financial information of the bill validator to a connected accounting system. The particular gaming machine software does not normally track all of the operational information of the bill validator. Modification of the software used by the gaming machine is a difficult and expensive process and in most cases is avoided.

With the system as now proposed the bill validator provides detailed report information to the printer and a printed bill validator report is generated for review by the technician at the gaming machine. This generated report can also be associated with a validator that is removed for subsequent repair or service. There is no requirement to change any software associated with the gaming machine and this enhanced bill validator information is made readily available to the technician. As the bill validator and the printer are required components of the gaming machine, no additional hardware costs other than the physical cables connecting the bill validator and the printer are necessary to make this enhanced information readily available. It is also preferably to use an input signal to the bill validator to instruct the printer to produce a printer report.

As is generally known, it is desirable to keep the gaming machines in operation and to minimize downtime. In gaming machines problems associated with bill validators are the second most common factor that requires investigation by a technician. The third most common problem is associated with the printer. Therefore the generation of bill validator and printer performance reports at a gaming machine provides a substantial benefit to the operator.

The Last 5 Bills Inserted Report 240 illustrated in FIG. 7 is most helpful as this provides a simple arrangement for solving potential disputes between the operator and a customer. There are circumstances where a customer believes he inserted a banknote or ticket of a certain value and that the game machine did not provide the appropriate credit. These credits are all processed by the bill validator as both vouchers and banknotes are processed by the bill validator.

In the event of a possible dispute, the technician merely instructs the bill validator to produce a Last 5 Bills Report and this is printed at the printer. The technician can then show the customer the contents of this report and determine whether additional investigation is required. This further investigation normally requires the removal of the cashbox and the subsequent processing in a secure room such that the actual vouchers or banknotes in potential dispute can be obtained. In many cases, the customer upon receiving the Last 5 Bills Report, will reconsider his position and accept what the game machine has identified. This provides an efficient method or at least an initial step in resolving disputes and returning the game machine to normal operation and allowing the customer to resume game play.

Figure 9:
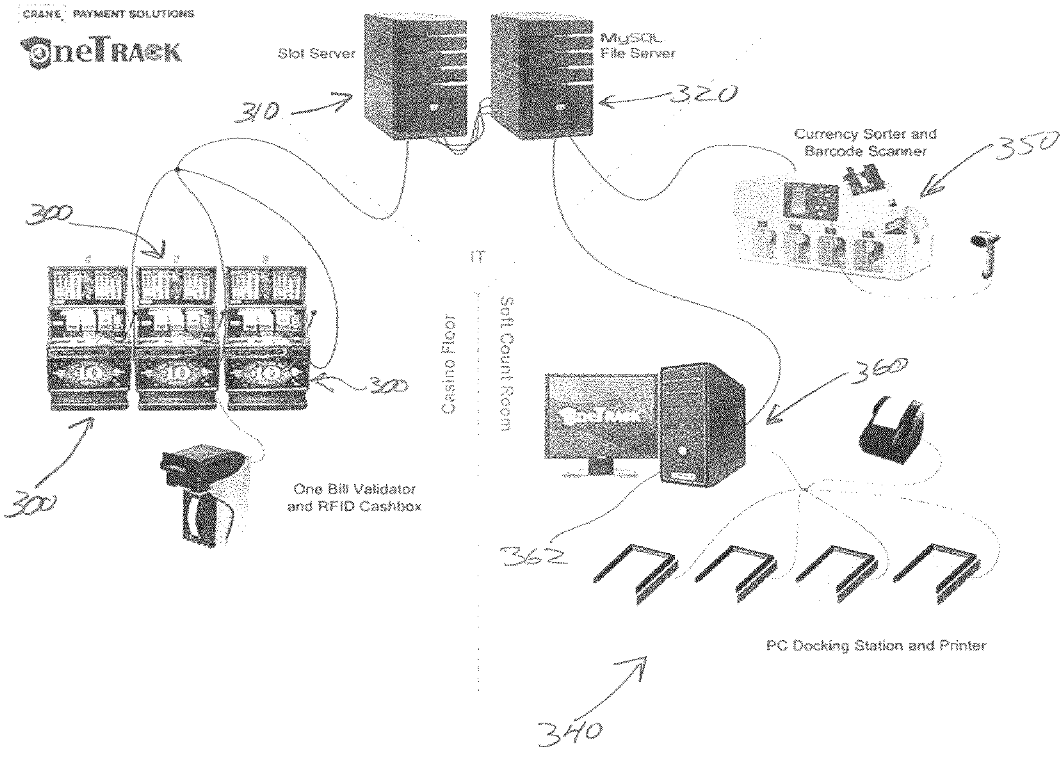
FIG. 9 is a schematic of an overall system layout.

FIG. 9 shows the use of the present system in a casino environment. Each of the slot machines 300 include a bill validator and a printer as described in the present application. The slot machines 300 are in communication with the slot server 310. The slot server 310 is in communication with the file server 320 which is in communication with the soft count room 340.

The soft count room 340 is a secure room which allows for counting of the currency in the cashboxes. A currency sorter and bar code scanner 350 in the secure room allows for scanning of the banknotes and vouchers provided in each cashbox as well as scanning of the Cashbox Audit and Performance Report (CAPR) 230 of FIG. 6 that is provide with each cashbox. Preferably this ticket is provided to the cashbox through the bill validator and thus is available in the cashbox when it is opened. The contents of the CAPR report 230 is inputted to the tracking arrangement shown as 360. Basically the information from the report is provided to a database tracking system and is maintained in the database tracking system.

As previously described, this report can include additional information that is not provided by the individual gaming machines to an associated electronic tracking of the bill validator in each slot machine. Therefore the information provided on the report 230 will include all of the information that is provided by the gaming machine back to the online accounting system. Furthermore, the report preferably includes additional information. This additional information can be scanned from the report 230 and loaded into a separate database associated with the bill validator. If there is a discrepancy between the contents of the cashbox as actually determined in the secure room and the report 230 or by the electronic report provided by the individual gaming machine, further investigation can be completed. The report 230 provides additional information for the operator to identify errors and make corrections. If a printer report is included, it can be scanned and the data analyzed for possible service requirements.

A further aspect of this system is with respect to generating accounting information. In existing systems, gaming machines provide electronic accounting information to a computer accounting software system provided in a secure room. This system is quite specialized and such a system may cost in the range of $100,000 to $200,000. For a large casino this investment is justified and allows them to optimize and track the various gaming machines.

For many smaller gaming locations, the cost to electronically track individual gaming machines may be difficult to justify. For example, there may be an operator that is effectively managing 50 gaming machines. The generation of a CAPR report in some circumstances may be sufficient to provide proper accounting for such a small location operator.

In the present system, the contents of each cashbox is known and the CAPR report is preferably processed by the bill validator and stored directly in the cashbox prior to removal from the gaming machine. Once in the secure room, the contents of the cashbox can be accurately determined and compared with information downloaded from the CAPR report. As can be appreciated, the use of the 2-dimensional barcode portion 232 allows for the transmission of detailed information with respect to the validator and cashbox. Additionally, the barcode is difficult to manually interpret and can be encrypted if desired. This report can also include printer performance reports to not only allow for the tracking of accounting-type information but also to allow assessment of maintenance problems associated with the bill validator and/or printer of particular gaming machines.

Figure 8:
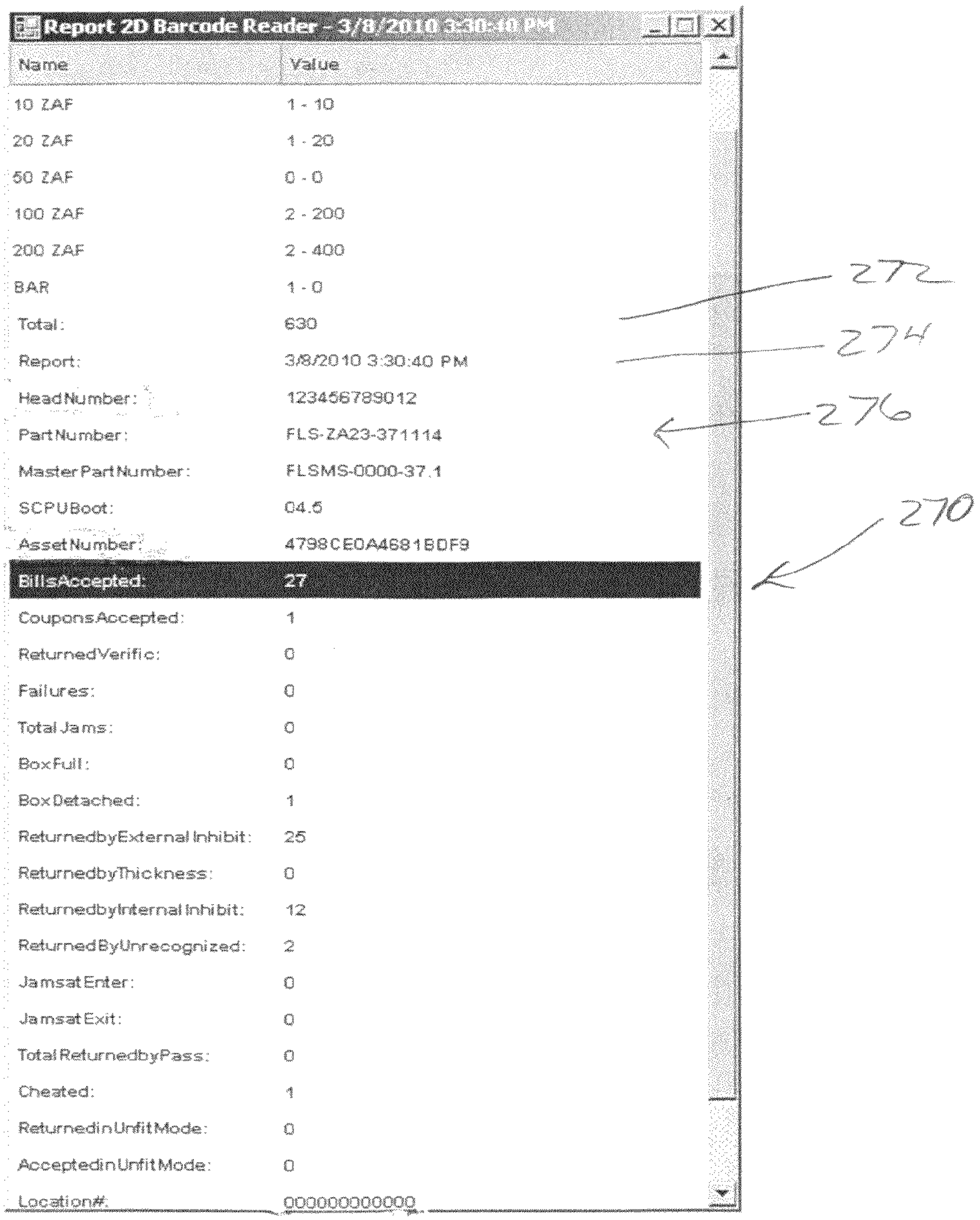
FIG. 8 is a sample report providing details of a 2 dimensional bar coded CAPR report.

FIG. 8 illustrates one report 270 that is available from the database maintained by the computer 362. This report provides details of a particular cashbox and the performance of the validator that was associated with the gaming machine. The first portion of the report identifies the particular banknotes or coupons that were provided, the number of each type that were received and the value thereof. A total value of the contents of the cashbox is also provided at 272. A date is provided at 274 and details regarding the particular validator are generally shown at 276.

As can be appreciated from the report 270, the operator now has a separate database that allows him to assess the enhanced information that is provided by the CAPR report that may not otherwise be available. This database allows for maintenance evaluation as well as performance and this type of information is typically not currently available or easily provided to the operator. With this paper tracking system, a small operator has the additional cost of generating performance reports at the particular gaming machine and he uses the existing equipment within the gaming machine (i.e. the bill validator, the cashbox and the printer) to provide the information to his own dedicated system. The additional costs are minimal and the additional tracking information can be quite valuable.

As can be appreciated from the above, the printer of the present system produces reports of a length that are similar to the banknotes that are processed and stored in the cashbox. In this way the bill validator can accept the printed report that has been provided to it and store it in the cashbox for transportation. It is also possible to merely associate the reports with the cashbox.

The system as generally shown in FIG. 2 includes a direct connection from the bill validator to a printer using a serial connection or other suitable connection. This is a simple cost effective approach and avoids the necessity of modifying the software associated with a motherboard of the gaming machine. Although a gaming machine could be modified to provide this information, the modification of the software is expensive and is not practical. It would also be possible to provide a separate circuit board that acted as an intermediary between the bill validator and the printer. There is no need for such an additional processor but such an arrangement would avoid the necessity to modify the software associated with the motherboard of the gaming machine.

With the present system the bill validator includes a first channel for communication with the motherboard of a gaming machine and a separate communication channel for communicating with a printer or other device. The printer includes a first communication channel for communicating with the motherboard of the gaming machine and has a second communication channel for communicating with the bill validator either directly or indirectly. This second channel of both the printer and the bill validator does not include communication to the motherboard of the gaming machine. Preferably this is a direct connection to avoid any additional costs associated with a separate processor. As discussed above, one of the advantages of the present system is in providing bill validator information at the gaming machine in a printed report for review by a technician. The invention also has the advantage in that the bill validator and the printer can cooperate to produce both a bill validator performance report and a printer performance report by the technician inputting a particular instruction signal or signals to the bill validator. These reports are produced by the printer at the game machine and allow the technician to assess the performance of the equipment. The technician merely has to access the gaming machine and use straightforward and simple steps to produce reports for evaluation of the bill validator and printer.

The present arrangement also has benefits in providing an additional accounting security feature where the cashbox audit performance report is produced by the bill validator when the cashbox is to be removed. The technician preferably provides this report to the bill validator that stores it in the cashbox. This report can then be compared to the results of the physical removal of the contents of the cashbox. This report can also be compared to any electronic information provided by the gaming machine to backroom software regarding the contents of the cashbox.

In another embodiment of the present invention, a specific database may be provided to interpret the data from the various generated reports provided with the cashbox when removed from a gaming machine.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method comprising:

receiving, by a bill validator having an associated cashbox, a signal from a switch of the bill validator indicating at least one actuation of the switch;

determining, by the bill validator, that the received signal comprises a request to generate one of a plurality of bill validator reports, the request further comprising one of a plurality of report generation codes wherein each report generation code identifies a specific one of the plurality of bill validator reports and wherein each report generation code comprises a specific actuation sequence of the switch;

generating, by the bill validator, the specified bill validator report based on the determined report generation code; and sending, by the bill validator, the specified bill validator report to a printer.

2. A method as claimed in claim 1 including receiving the specified bill validator report, by the printer and printing the specified bill validator report at the printer.

3. A method as claimed in claim 2 including determining, by the printer, that the specified bill validator report is a bill validator performance report and based thereon generating by the printer a printer performance report and printing by the printer the printer performance report with the printing of the bill validator performance report.

4. A method as claimed in claim 1 wherein the bill validator and the printer are peripheral components of a gaming machine, and the bill validator communicates with a host computer of the gaming machine on a first communication path; and wherein the specified bill validator report comprises a cashbox audit and performance report containing financial information specific to the contents of the cashbox and said method includes using a second communication path to transmit the cashbox audit and performance report to the printer and printing thereof as part of a cashbox removal procedure.

5. A method as claimed in claim 4 wherein the cashbox removal procedure includes communication of removal of the cashbox to the host computer using the first communication path.

6. A method as claimed in claim 4 wherein the cashbox audit and performance report is printed on a paper substrate of a length and width acceptable in the bill validator, and said method includes the bill validator storing the printed cashbox audit and performance report in the cashbox before removal of the cashbox from the gaming machine.

7. A method as claimed in claim 4 including a cashbox removal procedure comprising the steps of generating a cashbox audit report and sending the cashbox audit report to the printer on the second communication path, receiving the cashbox audit report at the printer containing information specific to the contents of the cashbox before removal of the cashbox;

printing the cashbox audit report at the printer;

using the bill validator to receive and store the cashbox audit report in the cashbox; and releasing the cashbox from the gaming machine in preparation for receiving a new cashbox in the gaming machine.

8. A method as claimed in claim 4 wherein the bill validator reports include a service report;

the service report providing information allowing assessment of the operation of the bill validator at the gaming machine.

9. A method as claimed in claim 8 wherein the bill validator reports include a banknote sequence report that provides details of a sequence of the last several banknotes and/or coupons processed by the bill validator, the banknote sequence report being printed at the printer as part of a dispute resolution procedure associated with banknotes and/or coupons processed by the bill validator.

10. A method as claimed in claim 9 wherein the banknote sequence report includes details of at least the last 3 banknotes and/or coupons processed by the bill validator.

11. A method as claimed in claim 9 wherein the banknote sequence report includes details of at least the last 5 banknotes and/or coupons processed by the bill validator.

12. A gaming machine comprising:

a host computer controlling a plurality of peripheral devices using an accepted protocol;

said peripheral devices including a printer and a bill validator having an associated cashbox; said bill validator and said printer each being separately connected to said host computer and connected to each other by a separate communication channel;

said bill validator further comprising a switch which when actuated emits a signal, a processor, and a memory comprising computer executable instructions which when executed by the processor causes the processor to perform the method of:

receiving a signal from the switch indicating at least one actuation of the switch;

determining that the received signal comprises a request to generate one of a plurality of bill validator reports, the request further comprising one of a plurality of report generation codes wherein each report generation code identifies a specific one of the plurality of bill validator reports and wherein each report generation code comprises a specific actuation sequence of said switch;

generating the specified bill validator report based on the determined report generation code; and sending the specified bill validator report to the printer using the separate communication channel.

13. A gaming machine as claimed in claim 12 wherein said bill validator reports include a banknote sequence report including details of a last sequence of banknotes and/or coupons received by said bill validator.

14. A gaming machine as claimed in claim 12 wherein said plurality of bill validator reports include a cashbox audit report of the contents of said cashbox.

15. A gaming machine as claimed in claim 14 wherein said bill validator includes a cashbox removal procedure; said cashbox removal procedure including generating a cashbox audit report of the contents of the cashbox and printing thereof by said printer, receiving the printed cashbox audit report in said bill validator and storing thereof in said cashbox prior to release of the cashbox from the bill validator.

16. A gaming machine as claimed in claim 12 wherein said switch is part of a cashbox latch and actuation of said switch is a depression of said cashbox latch and each specific actuation sequence is a series of depressions of said cashbox latch and/or a depression of said cashbox latch of a specified time interval.

17. A gaming machine as claimed in claim 16 wherein said bill validator reports include a bill validator performance report; and wherein said printer includes a processor and software that when executed produces a printer performance report, said printer generating and printing said printer performance report at the gaming machine upon receiving a bill validator performance report from said bill validator.

18. A gaming machine as claimed in claim 12 wherein said plurality of bill validator reports include a bill validator performance report that includes details of parameters used to assess performance of the bill validator and the firmware used by the bill validator.

19. A gaming machine as claimed in claim 14 wherein said bill validator is provided with an encryption arrangement used to encrypt said cashbox audit report and said printer prints the encrypted cashbox audit report when received.

20. A gaming machine as claimed in claim 19, wherein said encrypted cashbox audit report includes a two-dimensional bar coded report of the contents of the cashbox.

21. A gaming machine as claimed in claim 20 wherein said encrypted cashbox audit report printed by said printer is of a length receivable within the cashbox in the manner of an accepted bill.

22. A gaming machine as claimed in claim 12 wherein said printer is a ticket in ticket out type printer.

23. A method comprising:

receiving, by a bill validator, a signal from a cashbox latch indicating at least one depression of the cashbox latch;

determining, by the bill validator, that the received signal comprises a request to generate one of a plurality of bill validator reports, the request further comprising one of a plurality of report generation codes wherein each report generation code identifies a specific one of the plurality of bill validator reports and wherein each report generation code comprises a specific number of depressions or a depression of a specified time interval of the cashbox latch within a fixed time interval;

generating, by the bill validator, the specified bill validator report based on the determined report generation code; and sending, by the bill validator, the specified bill validator report to a printer.

24. A system comprising:

a bill validator having an associated cashbox and a cashbox latch which when depressed emits a signal; and a printer;

said bill validator comprising:

a processor; and a memory comprising computer executable instructions which when executed by the processor causes the processor to perform the method of:

receiving a signal from the cashbox latch indicating at least one depression of the cashbox latch;

determining that the received signal comprises a request to generate one of a plurality of bill validator reports, the request further comprising one of a plurality of report generation codes wherein each report generation code identifies a specific one of the plurality of bill validator reports and wherein each report generation code comprises a specific number of depressions or a depression of a specified time interval of the cashbox latch within a fixed time interval;

generating the specified bill validator report based on the determined report generation code; and sending the specified bill validator report to a printer.

* * * * *